April 8, 1941.    L. F. BERG    2,237,808
WATER HEATER AND CONTROL THEREFOR
Filed Sept. 7, 1939    2 Sheets-Sheet 1
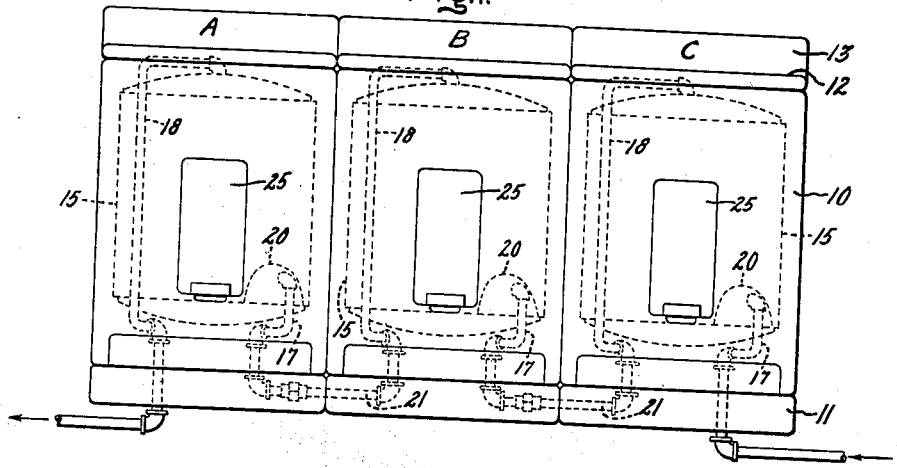
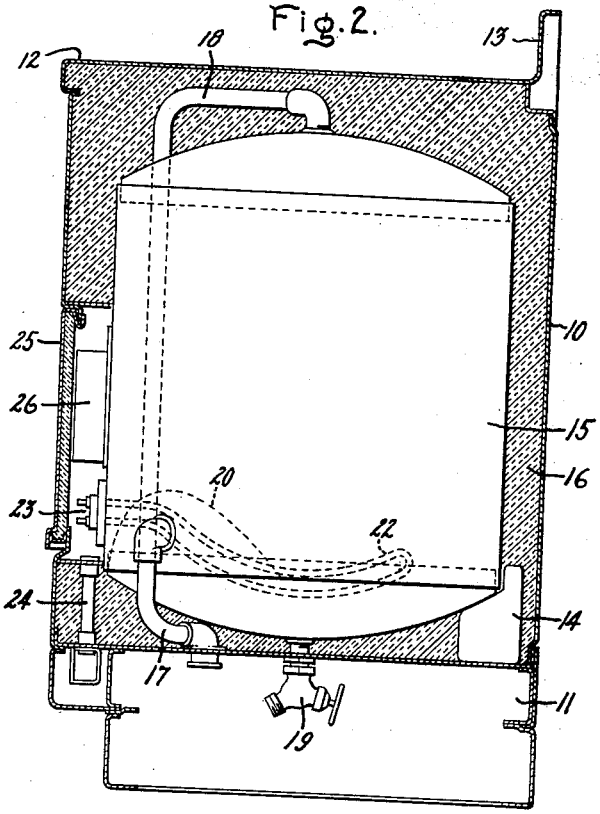
Inventor:
Leo F. Berg,
by Harry E. Dunham
His Attorney.

April 8, 1941.                L. F. BERG                2,237,808
                    WATER HEATER AND CONTROL THEREFOR
                        Filed Sept. 7, 1939        2 Sheets-Sheet 2
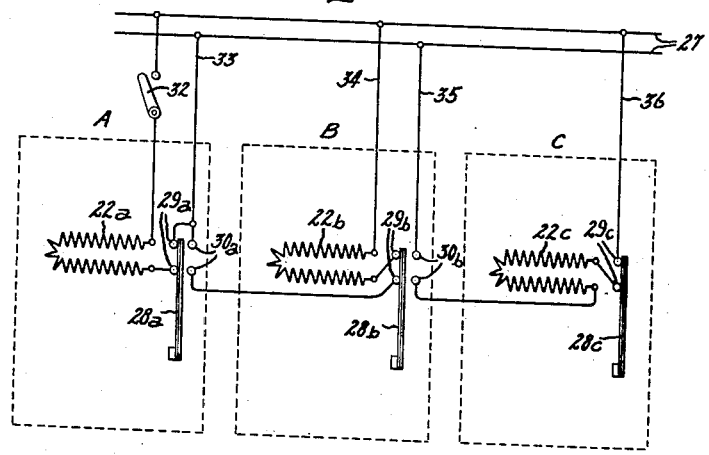
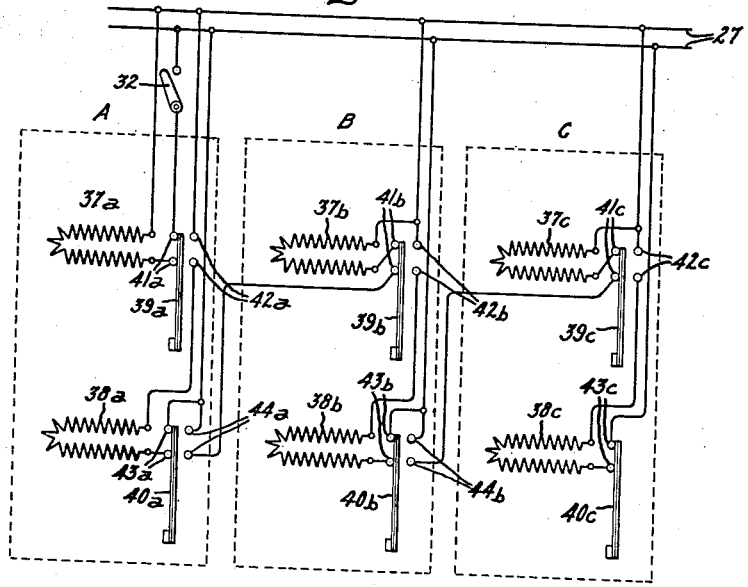
Inventor:
Leo F. Berg,
by Harry E. Dunham
His Attorney.

Patented Apr. 8, 1941

2,237,808

UNITED STATES PATENT OFFICE 2,237,808

WATER HEATER AND CONTROL THEREFOR

Leo F. Berg, Oak Park, Ill., assignor to Edison General Electric Appliance Company, Inc., Chicago, Ill., a corporation of New York Application September 7, 1939, Serial No. 293,740

8 Claims. (Cl. 219—39)

This invention relates to water heating system, more particularly to a water heating system embodying a group of electric water heaters, and it has for its object an improved system of this character.

In many water heater installations where insufficient capacity is obtained with a single water heater, a second or third heater is often installed and connected in series with the original heater to increase the amount of hot water storage. One serious drawback of such a series arrangement is that the connected electrical load of the system becomes excessive particularly if more than one or all of the units are energized at the same time. For example, assuming that each water heater has a load demand of two kilowatts, then if three of these heaters were connected in series, the total connected load could be as high as six kilowatts when all three units are energized.

It is an object of my invention to obviate this condition and to provide an arrangement whereby a plurality of water heaters may be connected in series and the connected load of the heaters will be limited to the load of only a single heater. In other words, it is the principal object of my invention to provide a multiple heater arrangement with a control for the heating elements of the heaters such that only a single heater unit will be energized at any one time.

It is a further object of my invention to provide a control system for a multiple water heater arrangement which is constructed and arranged so that the maximum electrical demand of the group of heaters is reduced to the demand of one of the units in the group.

It is a further object of my invention to provide a multiple heater arrangement in which the heater capacity may be built up at no increase in kilowatt demand.

It is a further object of my invention to provide a water heater arrangement in which a large hot water capacity is obtained with a minimum amount of mixing of the hot and cold water. In general, mixing increases as the capacity of a water heater unit is increased. In my arrangement a number of small units take the place of one large unit so that under normal hot water demands mixing is restricted to only a portion of the total storage capacity.

In accordance with my invention, I have provided a plurality of separate water heater units which are mechanically connected together in series relation by piping. In order to control the system so that the connected load will not exceed the load required by any one of the separate units, separate controls are provided for each unit and these controls are interconnected so that the heating element of one unit must be deenergized before the heating element of a second unit is energized. Each of the controls is temperature responsive and certain ones are constructed to automatically disconnect from the line the heater unit on which it is located and connect to the line the next adjacent heater unit upon the occurrence of a predetermined temperature condition.

For a more complete understanding of my invention reference should be had to the accompanying drawings in which Fig. 1 is an elevation view of a multiple unit water heater system showing the piping connections for the system; Fig. 2 is a side elevation partly in section showing details of one of the heater units shown in Fig. 1; Fig. 3 is a diagrammatic view of my improved control arrangement for the multiple unit shown in Fig. 1; and Fig. 4 is a diagrammatic view of a modified form of control for a multiple unit heater.

Referring to Fig. 1, I have shown a multiple unit water heater system comprising three separate water heaters A, B and C, connected together in series relation. While I have illustrated a multiple unit water heater having a group of three separate water heater units, it is, of course, understood that my invention is not limited to this precise number but may be applied to a multiple unit water heater having two or more units therein. In the form of my invention illustrated in Fig. 1, each of the individual water heater units has a table-top type of construction and comprises a casing 10 mounted on a suitable hollow base member 11 and having a substantially flat top 12 and a vertically extending flange 13 which is adapted to serve as a back splasher plate for the flat table-top 12. If desired, the form of my invention illustrated in Fig. 1 could be modified so that two or more heater units are mounted in a single casing unit, a single table-top or work surface. It is to be understood, however, that it is not intended to limit my invention to the table-top type of water heater since my invention may be used with any type of water heater unit.

Supported within the casing 10 by means of a plurality of suitable supports 14, only one of which is shown in Fig. 2, is the water heater tank 15 which comprises a substantially cylindrical tank having in this particular installation a capacity of approximately thirty gallons. In order to reduce the heat losses from the tank and to thereby reduce the amount of energy required to maintain the temperature of the water within the tank, there is located between the tank 15 and the walls of the casing 10 a layer 16 of suitable heat insulating material, such as rock wool. Each tank in the group of heaters is provided with a water inlet pipe 17 adjacent its lower end and with a water outlet pipe 18 in the top thereof and arranged in the bottom of each tank is a drain outlet 19 by which the contents of the tank may be drained. Provided within each tank opposite the water inlet opening is a baffle 20 which is arranged to deflect the cold incoming water so as to prevent turbulence in the bottom of the tank and the resultant mixing of the cold inlet water with the hot water already within the tank. As shown in Fig. 1, the tanks are mechanically connected together so that they are arranged in series, the water outlet of one tank being connected to the water inlet of the next succeeding tank by means of suitable piping 21. It will be understood that the water inlet to tank C is connected to the cold water supply pipe and the water outlet of tank A is connected to the hot water supply pipe.

In the embodiment of my invention shown in Figs. 1 and 2, the individual water heater tanks are of the single heater element type and there is provided in the bottom of each tank a single hairpin heater element 22 having terminal connections 23 which are adapted to be connected to a suitable source of power brought into the water heater casing through the conduit 24. Provided in the front wall of each of the casings 10 is an opening covered by a suitable cover plate or door 25. Mounted on the side wall of the tank 15 so as to be in direct thermal relation therewith is a suitable temperature responsive device 26. The opening provided on the front wall of the casing 10 is sufficiently large to permit access to both the terminals 23 and the temperature responsive device 26 so that these devices may be inspected or the adjustment of the temperature responsive device may be altered. While the temperature responsive device 26 may be of any suitable construction, one important consideration is that it must be adapted to be attached to the tank 15 so as to be in direct thermal relation with the side walls thereof so that the control closely follows the temperature of the water in the tank. In the preferred form of my invention, a temperature responsive device of the type described and claimed in United States Letters Patent 2,061,418, granted November 17, 1936, on an application filed by Wallace J. Ettinger and assigned to the assignee of the present invention, is employed.

As previously described, this invention relates to an arrangement for increasing the hot water capacity of an installation without increasing the load demand of the installation beyond the demand of the highest electrically rated unit in the system. In Fig. 3, I have illustrated a circuit arrangement by which this is accomplished with water heater units of the single heater element type, such as illustrated in Fig. 2. Referring more in detail to Fig. 3, it will be observed that there is provided an electrical supply circuit 27 which is connected to a suitable source of power (not shown). As previously described, there is provided in each of the water heater units A, B and C, a heating element 22a, 22b and 22c respectively, each element being shown diagrammatically in Fig. 3. Each of the heater elements is provided with a temperature control device having, as shown diagrammatically, a bimetallic temperature responsive element 28a, 28b and 28c respectively. The temperature responsive element 28a in the heater unit A cooperates with two pairs of fixed contacts 29a and 30a; the element in heater unit B cooperates with two similar pairs of fixed contacts 29b and 30b; but the element in heater unit C cooperates with but one pair of fixed contacts 29c. It is thus seen that in effect the heater units A and B are provided with a double-throw control switch and heater C with a single-throw control switch and in each the control switch is actuated by movement of a temperature responsive element. In order to control the energization of the battery of water heaters, a supply switch 32 is located in the supply circuit of heater element 22a.

Considering now the operation of my improved control arrangement diagrammatically illustrated in Fig. 3 and assuming the control elements to be in the position shown, the switch 32 is closed thereby energizing the heater element 22a located in the water heater unit A, the electrical circuit being from one side of the line 27 through the switch 32, the heating unit 22a, the contacts 29a as closed by the temperature responsive element 28a, and lead 33 back to the other side of the line 27. When the water in the unit A reaches the predetermined desired temperature for which the control device is set, the temperature responsive element 28a moves to the right out of engagement with contacts 29a and into engagement with the contacts 30a. This movement deenergizes the heater element 22a. At the same time the heater 22b located in the unit B is energized, the electrical circuit being from one side of the line 27 through the lead 33, the contacts 30a as closed by the temperature responsive element 28a, the contacts 29b as closed by the temperature responsive element 28b, the heater unit 22b, the lead 34, and back to the other side of the line through the lead 34. The water in unit B is then heated by the heater element 22b and when the water in this unit reaches the predetermined desired temperature, the temperature responsive element 28b moves to the right opening the contacts 29b to deenergize the heater element 22b. Movement to the right of the bimetal blade 28b also causes the contacts 30b to be closed thus energizing the heater 22c located in unit C, the electrical circuit being from one side of the line 27 through the lead 35, the contacts 30b as closed by the element 28b, the heater element 22c, the contacts 29c as closed by the temperature responsive element 28c, the lead 36, and back to the other side of the line 27. The heater unit 22c then heats the water in the unit C and, when the temperature thereof increases to the predetermined desired temperature, the temperature responsive element 28c moves to the right to deenergize the heater 22c.

As hot water is drawn from the unit A, cold water will be drawn into the unit C thus reducing the temperature of the water in the unit C and causing the element 28c to close the contacts 29c thereby energizing the heater element 22c. If a sufficiently large quantity of hot water is drawn from the unit A, all of the hot water will be drawn from the unit C and cold water will completely fill the unit C and will be drawn into the unit B. This will reduce the temperature of the water in unit B and will cause the temperature responsive element 28b of unit B to move to the left to open the contacts 30b to deenergize the heater 22c and then close the contacts 29b to energize the heater 22b in unit B. If the withdrawal of warm water is limited to a little more than the capacity of the unit C, then upon the water in the unit B reaching the predetermined temperature, the element 22b will be deenergized and the element 22c energized, as previously described. If, however, the demand being made on the hot water supply is greater than the capacity of both the unit C and the unit B, both of these units will fill with cold water and cold water will be drawn into the unit A. When this occurs, the temperature responsive element 28a will move to the left opening the contacts 30a and deenergizing the heater 22b, and closing the contacts 29a to energize the heater element 22a. The heater 22a will then be called into service to supply the hot water demand. As is the case with unit B, when the temperature of the water within the unit A is raised to a predetermined value, the temperature responsive element 28a will move to the right to deenergize the heater unit 22a and energize the heater unit 22b as previously described.

It will be appreciated that my improved control arrangement produces considerable flexibility in operation and, if desired, any or all of the heater units 22a, 22b and 22c could be further controlled by a suitable timing device so that they are energized only during off-peak hours thereby providing more economical rates for the power consumed.

In the form of my invention illustrated in Fig. 3, it is preferable that the heater element 22a be designed to have an electrical rating larger than either the heater element 22b or 22c. This increased rating of the heater element permits the water heater unit A to supply hot water even though there is an unusually large demand on the system requiring more hot water than is stored in the units B and C. In one particular application, the heater element 22a is designed to have a rating of 2500 watts and the remaining units to have a rating of 1750 watts each.

From the preceding detailed description of the operation of my improved control arrangement, it is seen that I have provided a water heater system in which a large amount of hot water may be stored in the system and yet the kilowatt load demand is limited to the demand of a single water heater unit having a much smaller capacity than the storage capacity of the system as a whole. This produces a very efficient water heater arrangement for producing an adequate supply of hot water without subjecting a power distribution system to excessive loads. In addition, by providing a battery of separate water heater units, mixing of the hot and cold water is substantially less than that which would occur if a single unit of the same capacity were used and under normal days of hot water demand the mixing is restricted to only a portion of the total storage capacity.

In Fig. 4, I have shown a modified form of circuit controlling arrangement. The essential feature of this modification is that my improved control arrangement is applied to a group of water heaters A, B and C of the twin heater element type of construction, such as described and claimed in United States Letters Patent 1,892,557, issued December 27, 1932, on an application filed by Francis H. McCormick and assigned to the assignee of the present invention. The operation of this system is substantially the same as that described in connection with the control arrangement illustrated in Fig. 3. There is provided an electrical supply source 27 which is connected to a suitable source of power (not shown) and each of the heater units A, B and C is provided with a pair of heating elements 37a and 38a, 37b and 38b, and 37c and 38c, respectively, and a pair of temperature responsive elements 39a and 40a, 39b and 40b, and 39c and 40c respectively. In each unit, the heater elements 37a, 37b and 37c are located near the top of the water heater tank and the temperature responsive elements 39a, 39b and 39c are mounted outside of the tank near the top thereof. The heater elements 38a, 38b and 38c are located adjacent the bottom of the heater tank similar to heater element 22 shown in Fig. 2, and the temperature responsive elements 40a, 40b and 40c are mounted on the outside of the tank adjacent the bottom thereof. With the exception of the temperature responsive element 40c located adjacent the bottom of unit C, each of the temperature responsive elements cooperate with two pairs of contacts, the elements 39a, 39b and 39c cooperating with pairs of contacts 41a and 42a, 41b and 42b, and 41c and 42c respectively and the elements 40a and 40b cooperating with pairs of contacts 43a and 44a and 43b and 44b respectively. The element 40c cooperates with a single pair of contacts 43c to control the energization of heater element 38c. By this construction and arrangement the heater elements of all the units in the group are interconnected so that only one of the heater elements may be energized at one time thereby restricting the kilowatt load to that of a single heating element.

The operation of the arrangement shown in Fig. 4 is substantially the same as that illustrated in Fig. 3. Assuming the control elements to be in the position illustrated and the switch 32 to be closed, the heater element 37a will be energized. As the water in the top of the tank of the unit A is heated, the bimetal element 39a moves to the right opening the contacts 41a to deenergize the element 37a and closing the contacts 42a. With the contacts 42a closed, the heater element 38a located in the bottom of the tank of the unit A is energized. When the water in the bottom of the tank A is heated to the predetermined desired temperature, the control element 40a moves to the right opening the contacts 43a and closing the contacts 44a. This movement causes the heater element 38a to be deenergized and the top heater element 37b of the heater unit B to be energized. The control cycle just described for unit A then takes place in unit B. When the water in the bottom of unit B has reached its predetermined temperature, the control 40b is actuated to deenergize the element 38b and cause the element 37c to be energized. The water in unit C is then heated and when the water in the bottom of unit C is heated, the unit 38c is deenergized thus deenergizing the entire system. When hot water is drawn from the unit A, cold water will be drawn into the unit C and will cause the element 40c to move into engagement with the contacts 43c so as to energize the heater element 38c. If the element 38c cannot heat the cold water entering the unit C, then the cold water will move upwardly in the tank C and cause energization of the unit 37c and deenergization of the unit 38c. In this manner, the control will move back through the units C, B and A in accordance with the amount of hot water drawn from the unit A. It is to be observed, however, that at no time will more than one heating element be energized.

While I have shown particular embodiments of my invention, it will be understood, of course, that I do not wish to be limited thereto since many other modifications may be made, and I, therefore, contemplate by the appended claims to cover any such modifications as fall within the true spirit and scope of my invention.

What I claim as new and desire to secure by Letters Patent of the United States, is:

1. In a water heating system, a plurality of separate water heater tanks connected together in series, heating means for each of said tanks for heating the water contained therein, separate temperature responsive means for each of said tanks controlling the heating means of the tank to control the temperature of the water in the tank, and means interconnecting said control means so that the heating means for only one of said tanks can be energized at any one time.

2. In a multiple water heater arrangement, a plurality of separate water heating tanks, heating means for each of said tanks for heating the water therein, separate thermostatic means controlling the heating means for each tank to control the temperature of the water in the tank, and means interconnecting said thermostatic means for all of the tanks so that the electrical energy demand of said multiple heater arrangement is limited to the demand of the heating means for only one of said tanks.

3. In an electric water heating system, a plurality of separate water heater units mechanically connected together in series, one of said units being adapted to be connected to a cold water supply line, heating means for each of said units, temperature responsive means for each of said units except said unit connected to the cold water supply line for controlling the heating means for the associated unit and the heating means for the next succeeding unit so that only one of the heating means in said units can be energized at one time, and temperature responsive means in said heater unit adapted to be connected to said cold water supply line controlling the heating means located therein.

4. In an electric liquid heating system, a plurality of separate liquid heater units one of which is connected to a liquid supply line, heating means for each of said units, temperature responsive means on each of said units for controlling the temperature of the liquid therein, double-throw switch means for each of said units except said unit connected to said supply line, said double-throw switch means actuated by said temperature responsive means to control the heating means for the unit in which it is located and the next succeeding unit so that only one of said heating means may be energized at one time, and single-throw switch means located on said unit connected to said liquid supply and adapted to be actuated by the temperature responsive means for this unit to control the heating means located therein.

5. In an electric water heating system, a plurality of separate water heater units mechanically connected together in series, one of said units being connected to the cold water supply line and another of said units being connected to the hot water supply line, heating means for each of said units, said heating means for said unit connected to the hot water supply line having an electrical rating higher than the heating means for the remaining units, temperature responsive means for each of said units for controlling the heating means for the unit, and means for interconnecting said temperature responsive means so that only one of said heating means will be energized at any one time thereby limiting the electrical load demand of the system to the load demand of the heating means having the highest electrical rating.

6. In an electric water heater system, a plurality of water heater units connected together in series, a plurality of heating elements located at different portions of each of said units, means responsive to the temperature of the liquid in one portion of each unit for controlling the energization of said elements of said unit so that only one of said elements will be energized at any one time, and means responsive to the temperature of the liquid in another portion of each unit for controlling the energization of the elements of adjacent units so that only one of said units is energized at one time.

7. In an electric water heater system, a plurality of water heater units connected together in series, one of said units being connected to the cold water supply line for the system and another of said units being connected to the hot water supply line for the system, a plurality of heating elements located at different portions of each of said units, means on each of said units responsive to the temperature of the liquid in one portion of each unit for controlling the energization of the elements for said unit so that only one of said elements will be energized at any one time, means on all but said unit connected to the cold water supply line for controlling the heating elements for said heater units in response to the temperature of another portion of each unit so that the heating elements for one unit must be deenergized before the heating elements for the next adjacent unit can be energized, and means on said unit connected to said cold water supply line for controlling the last element energized for said unit in response to the temperature of the liquid in the portion of said unit near the bottom thereof so that said last element will be deenergized at a predetermined temperature corresponding to the attaining of full hot water storage capacity in said system.

8. In an electric water heating system, a plurality of separate water heater units connected together in series, one of said units being connected to the cold water supply line and another of said units being connected to the hot water supply line, a pair of heating elements located in each of said units, one of said elements being near the top of each unit and the other of said elements being near the bottom of each unit, means on each unit responsive to the temperature of the liquid in the upper portion of the unit for controlling both of said heating elements in said unit so that when the liquid in said upper portion has attained a predetermined high temperature the heating element for said portion is rendered ineffective and the heating element for the lower portion is rendered effective, means on each unit except said unit connected to said cold water supply line responsive to the temperature of the liquid in the lower portion of the unit for controlling the heating element for the lower portion of said unit and the heating element for the upper portion of the next succeeding unit so that when the liquid in said lower portion of said unit attains a predetermined high temperature the heating element for said lower portion is rendered ineffective and the heating means for the upper portion of said next succeeding unit is rendered effective, and means responsive to the temperature of the liquid in the lower portion of said unit connected to said cold water supply line to render the heating element in said last mentioned lower portion ineffective upon the liquid in said lower portion of said unit attaining a predetermined temperature.

LEO F. BERG.